United States Patent
Hallowell et al.

(10) Patent No.: US 9,052,915 B2
(45) Date of Patent: Jun. 9, 2015

(54) BOOTING A MACHINE USING THERMAL CREDITS TO ADJUST OPERATING SPEED OF A COMPONENT

(75) Inventors: William C Hallowell, Spring, TX (US); Walter G. Fry, Houston, TX (US); Rahul V. Lakdawala, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

(21) Appl. No.: 13/822,630

(22) PCT Filed: Sep. 13, 2010

(86) PCT No.: PCT/US2010/048655
§ 371 (c)(1),
(2), (4) Date: Mar. 12, 2013

(87) PCT Pub. No.: WO2012/036665
PCT Pub. Date: Mar. 22, 2012

(65) Prior Publication Data
US 2013/0205130 A1   Aug. 8, 2013

(51) Int. Cl.
*G06F 9/44* (2006.01)
*G06F 1/20* (2006.01)
*G06F 1/32* (2006.01)

(52) U.S. Cl.
CPC .............. *G06F 9/4401* (2013.01); *G06F 1/206* (2013.01); *G06F 1/324* (2013.01); *Y02B 60/1217* (2013.01); *Y02B 60/1275* (2013.01)

(58) Field of Classification Search
CPC ........ G06F 1/206; G06F 9/4401; G06F 1/324
USPC .............................................................. 713/2
See application file for complete search history.

(56) References Cited

U.S. PATENT DOCUMENTS

| | | |
|---|---|---|
| 6,622,254 B1 | 9/2003 | Kao |
| 7,219,252 B1 | 5/2007 | Li et al. |
| 7,634,678 B2 | 12/2009 | Winbom |
| 2005/0204181 A1* | 9/2005 | Montero et al. ............. 714/4 |
| 2006/0004538 A1* | 1/2006 | Cancel ..................... 702/136 |
| 2007/0083743 A1 | 4/2007 | Tsang |
| 2008/0005603 A1 | 1/2008 | Buch et al. |
| 2008/0256295 A1 | 10/2008 | Lambert et al. |
| 2009/0265575 A1 | 10/2009 | Chen |
| 2010/0146322 A1 | 6/2010 | Chien et al. |

OTHER PUBLICATIONS

WIPO, International Search Report dated Jun. 8, 2011, PCT/US2010/048655 filed Sep. 13, 2010.

* cited by examiner

*Primary Examiner* — Albert Wang
(74) *Attorney, Agent, or Firm* — Mahamedi Paradice LLP (57) ABSTRACT

Booting a computing machine including increasing an operating speed of at least one component of the computing machine during a boot process in response to the computing machine including a sufficient amount of thermal credits and decreasing the operating speed of at least one of the components in response to the computing machine completing the boot process.

13 Claims, 7 Drawing Sheets

BOOTING A MACHINE USING THERMAL CREDITS TO ADJUST OPERATING SPEED OF A COMPONENT

BACKGROUND

When powering on a computing machine, a user can access one or more power buttons or input devices of the computing machine. In response to a processor detecting the power button or input device being access, a boot process can be started by initializing and loading one or more components of the computing machine. The user can wait while the computing machine continues the booting process. Once the booting process is complete, the user can proceed to use the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By determining whether a computing machine includes a sufficient amount of thermal credits, an operating speed of at least one component of the computing machine can be increased. As a result, a boot process time of the computing machine can effectively and efficiently be reduced. Additionally, by decreasing the operating speed of at least one of the components in response to the computing machine completing the boot process, an amount of heat produced by at least one of the components can be decreased and an amount of power consumed by at least one of the components can be reduced after the boot process is complete.

Figure 1:
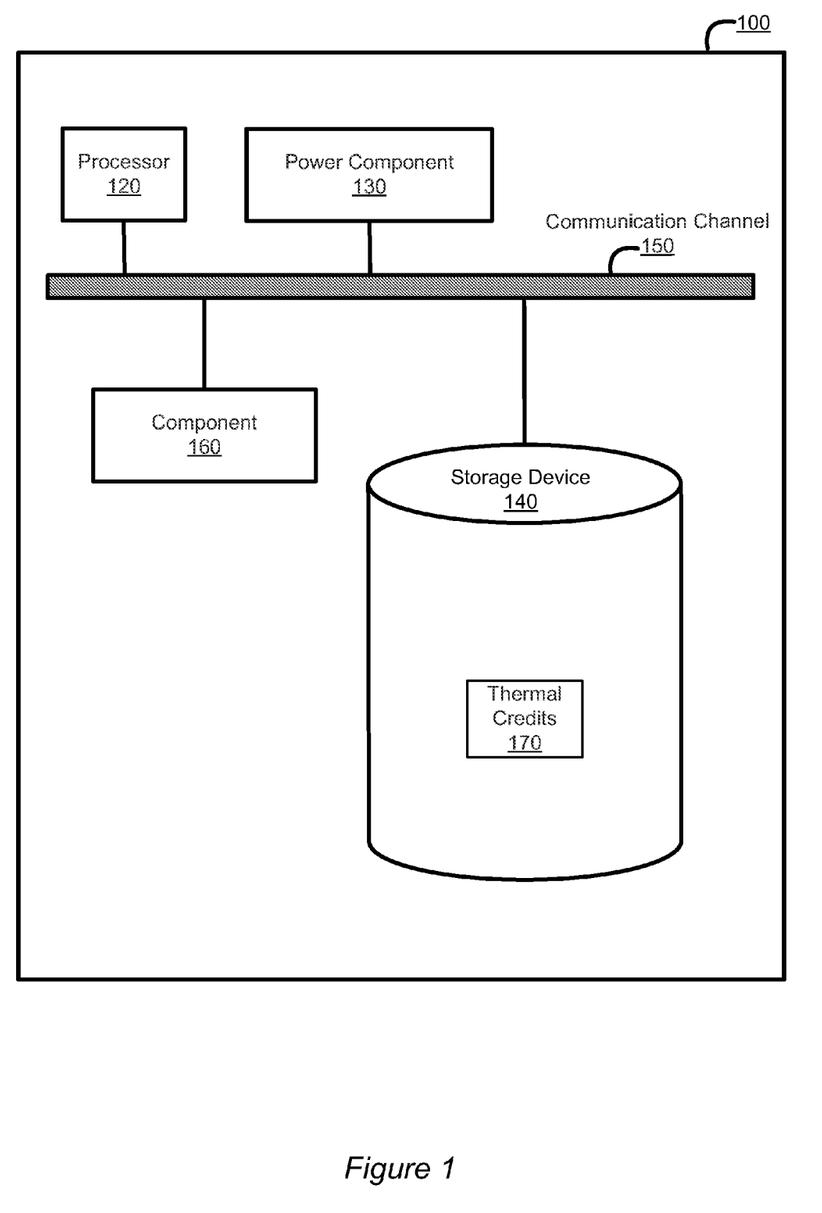
FIG. 1 illustrates a computing machine with at least one component according to an embodiment.

FIG. 1 illustrates a computing machine 100 with at least one component 160 according to an embodiment. In one embodiment, the computing machine 100 can be a desktop, a laptop, a tablet, a netbook a notebook, an all-in-one system, a server, and/or the like. In another embodiment, the computing machine 100 can be a cellular device, a PDA (Personal Digital Assistant), and/or any additional computing machine which can include at least one component 160.

As illustrated in FIG. 1, the computing machine 100 includes a processor 120, a power component 130, at least one component 160, a storage device 140, and a communication channel 150 for the computing machine 100 and/or one or more components of the computing machine 100 to communicate with one another. As illustrated in FIG. 1, the storage device 140 can include thermal credits 170. In one embodiment, the storage device 140 includes a power application. In other embodiments, the computing machine 100 includes additional components and/or is coupled to additional components in addition to and/or in lieu of those noted above and illustrated in FIG. 1.

As noted above, the computing machine 100 includes a processor 120. The processor 120 can send data and/or instructions to the components of the computing machine 100, such as the power component 130, one or more components 160, and/or the power application. Additionally, the processor 120 can read or receive data and/or instructions from components of the computing machine 100, such as the power component 130, one or more components 160, and/or the power application.

The power application is an application which can be utilized in conjunction with the processor 120 to control or manage the computing machine 100. In one embodiment, the power application is a BIOS (Basic Input/Output System) of the computing machine 100. When managing the computing machine 100, the processor 120 and/or the power application can control an operating speed of at least one component 160 of the computing machine 100 when the computing machine 100 includes a sufficient amount of thermal credits 170.

For the purposes of this application, thermal credits 170 can be credits or points which can be accumulated by the computing machine 100 while the computing machine 100 is in a power off or power on state. In one embodiment, an amount of the thermal credits 170 correspond to an amount of time which the computing machine 100 has been powered off. In another embodiment, an amount of the thermal credits 170 can correspond to a temperature of one or more components 160 of the computing machine 100.

The processor 120 and/or the power application can determine whether the computing machine 100 includes a sufficient amount of thermal credits 170 in response to the computing machine 100 powering on from a power off state and before a boot process of the computing machine 100 begins. For the purposes of this application, the boot process includes the computing machine 100 initializing or loading one or more components 160 and/or loading an operating system of the computing machine 100.

A component 160 of the computing machine 100 includes a device of the computing machine 100 which can operate at a higher speed to reduce a boot process time of the computing machine 100. In one embodiment, one or more components 160 can include a power component 130, a processor 120, a memory component, a storage component, a graphics component, an audio component, and/or a network component. In other embodiments, a component 160 can include additional devices or components of the computing machine 100 which can have an operating speed controlled in response to the computing machine 100 including a sufficient amount of thermal credits.

In response to determining the computing machine 100 including the sufficient amount of the thermal credits 170 when powering on, the processor 120 and/or the power application can determine that the computing machine 100 is cold booting and proceed to increase an operating speed of at least one component 160 of the computing machine 100 during the boot process. When increasing an operating speed of at least one component 160 of the computing machine 100, a power component 130 of the computing machine 100 can increase an amount of power supplied to one or more of the components 160. The power component 160 is a device of the computing machine 100 which can modify an amount of power supplied to the computing machine 100 during the boot process of the computing machine 100 and/or in response to the computing machine 100 entering and/or transitioning between one or more power states.

In one embodiment, one or more of the components 160 continue to operate at the increased speed until the boot process has completed. For the purposes of this application, the boot process is determined to be complete in response to one or more components 160 being loaded or initialized for use and/or in response to the operating system of the computing machine 100 being loaded for use. In response to the boot process completing, the processor 120 and/or the power application can proceed to decrease an operating speed of at least one of the components 160 of the computing machine 100.

The power application can be firmware which is embedded onto the processor 120, the computing machine 100, and/or the storage device 140. In another embodiment, the power application is a BIOS of the computing machine 100 or the power application is a software application stored on the computing machine 100 within ROM (Read-Only Memory) or on the storage device 140 accessible by the computing machine 100. In other embodiments, the power application is stored on a computer readable medium readable and accessible by the computing machine 100 or the storage device 140 from a different location.

In one embodiment, the storage device 140 is included in the computing machine 100. In other embodiments, the storage device 140 is not included in the computing machine 100, but is accessible to the computing machine 100 utilizing a network interface included in the computing machine 100. The network interface can be a wired or wireless network interface card. In other embodiments, the storage device 140 can be configured to couple to one or more ports or interfaces on the computing machine 100 wirelessly or through a wired connection.

In a further embodiment, the power application is stored and/or accessed through a server coupled through a local area network or a wide area network. The power application communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

Figure 2:
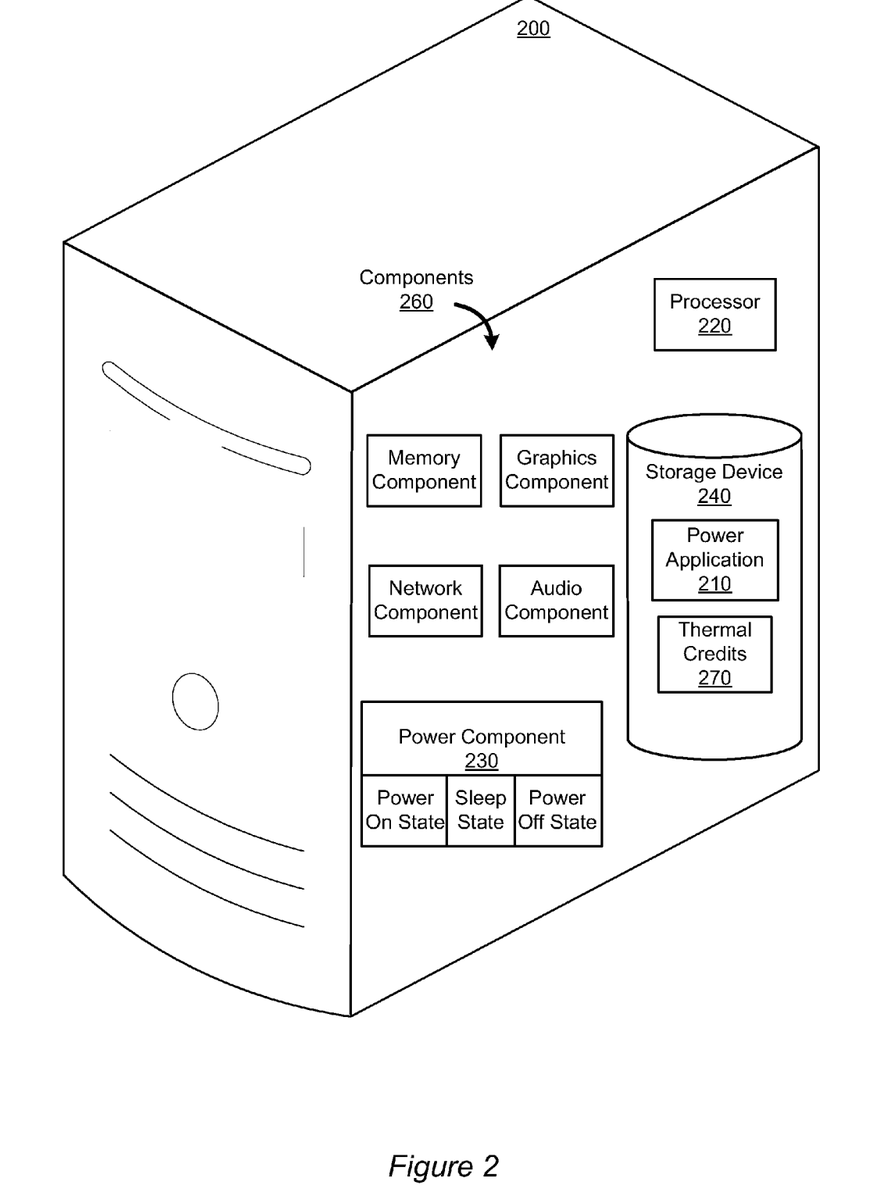
FIG. 2 illustrates a computing machine with a power component and one or more components according to an embodiment.

FIG. 2 illustrates a computing machine 200 with a power component 250 and one or more components 260 according to an embodiment. As noted above and as illustrated in FIG. 2, the computing machine 200 can be a power supply configured to power on the computing machine 200 and supply and/or modify an amount of power to one or more components 260 of the computing machine 200. In response to modifying an amount of power to one or more components 260 of the computing machine 200, the computing machine 200 can enter and/or transition between a power on state, a power off state, and/or a sleep state.

When the computing machine 200 is in a power off state, one or more components 260 of the computing machine 200 are not loaded or initialized and one or more of the components 260 receive little or no power from the power component 260. If the computing machine 200 is in a power off state, one or more of the components 260 consume little to no power. As a result, a temperature of one or more of the components 260 of the computing machine 200 is less than when the computing machine 200 is powered on and one or more of the components 260 are operating. As time increases while the computing machine 200 remains in the power off state, a temperature of one or more of the components 260 can continue to decrease.

In another embodiment, when the computing machine 200 is in a power on state, one or more components 260 of the computing machine 200 can be loaded and/or initialized during a boot process. When transitioning from a power off state to a power on state, a processor 220 and/or a power application 210 can detect the power component 250 increasing an amount of power supplied to one or more components 260 of the computing machine 200. In response to the computing machine 200 powering on, the boot process of the computing machine 200 can begin. As noted above, the boot process includes one or more components 260 initializing or loading and/or an operating system of the computing machine 200 loading.

In one embodiment, if the computing machine 200 includes a sufficient amount of thermal credits 270 when powering on, the computing machine 200 will be determined to be cold booting and the power component 250 can increase an amount of power supplied to one or more of the components 260 during the boot process. Using the increased power, an operating speed of one or more of the components 260 can be increased from a normal operating speed to an increased operating speed. One or more of the components 260 can operate at an increased operating speed during the boot process, until a boot process is complete, and/or until the thermal credits 270 run out.

A processor 220 and/or a power application 210 of the computing machine 200 can increase an operating speed of one or more of the components 260 by sending one or more signals or instructions to a corresponding component 260 to increase an operating frequency or a frequency MHZ (megahertz) of the component 260. A component 260 is determined to be operating at an increased speed, when the operating frequency or frequency of the corresponding component 260 is greater than a default or normal operating frequency or frequency of a normal speed. The normal speed of one or more components 260 can be defined by a user, the processor 220, the computing machine 200, and/or a manufacturer of a component 260 or the computing machine 200.

As illustrated in FIG. 2, one or more components 260 can include a processor 220, a memory component, a graphics component, a network component, an audio component, a storage device 240 and/or a power component 250. In other embodiments, the computing machine 200 can include additional components 260 which can operate at one or more speeds in addition to and/or in lieu of those noted above and illustrated in FIG. 2.

An operating speed of one or more components 260 can be reduced to a normal speed or a below normal speed in response to a boot process of the computing machine 200 being completed. The processor 220 and/or the power application 210 can decrease an operating speed of one or more of the components 260 by sending one or more signals or instructions to the corresponding component 260 to decrease an operating frequency or frequency of the corresponding component 260.

In one embodiment, the power component 250 can also reduce the amount of power supplied to one or more of the components 260. In another embodiment, when operating at a below normal speed, the corresponding component 260 will be operating at a speed or frequency which is less than the normal speed of the corresponding component 260.

Figure 3A:
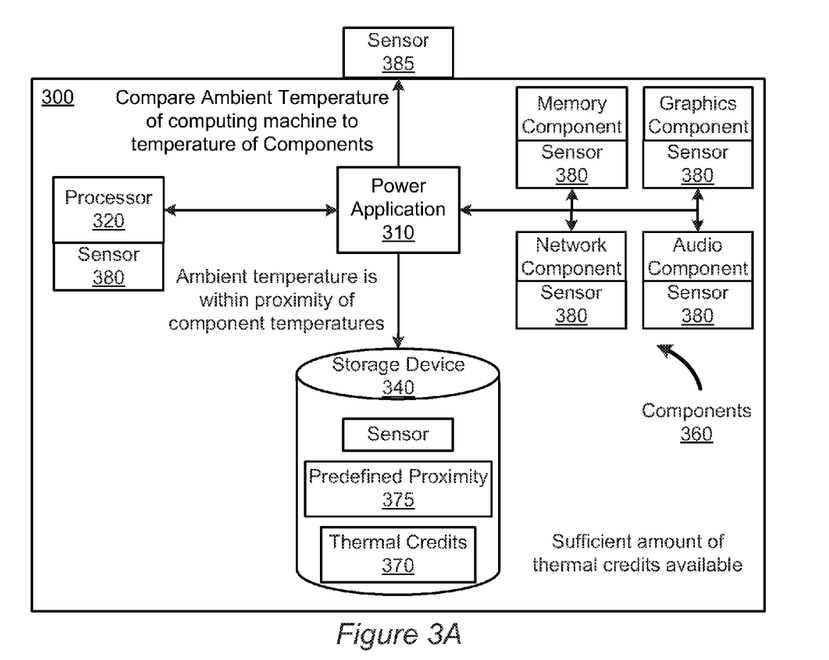
FIG. 3A illustrates a block diagram of a power application managing a computing machine according to an embodiment.

FIG. 3A illustrates a block diagram of a power application 310 managing a computing machine 300 according to an embodiment. When managing the computing machine 300, a processor 320 and/or a power application 310 determine whether the computing machine 300 includes a sufficient amount of thermal credits 370. As noted above, the thermal credits 370 can be represented as a value or number and the amount of thermal credits 370 available to the computing machine 300 can be based on a temperature of at least one component 360 of the computing machine 300. If the temperature of at least one component 360 of the computing machine 300 is less than or within a predefined proximity of an ambient temperature of the computing machine 300, the processor 320 and/or the power application 310 will determine that the computing machine 300 includes the sufficient amount of thermal credits 370.

As illustrated in FIG. 3A, the computing machine 300 can include a sensor 385. A sensor 375 can be a device or component which can detect, identify, and/or measure a temperature around the computing machine 300. In one embodiment, the sensor 385 can be an analog or digital thermal sensor which can be coupled to an exterior of the computing machine 300. As a result, the sensor 385 can detect an ambient temperature around the computing machine 300. The ambient temperature is a temperature of an environment where the computing machine 300 is located.

As illustrated in FIG. 3A, one or more components 360 of the computing machine 300 can include additional sensors 380. In one embodiment, all of the components 360 of the computing machine 300 include an additional sensor 380. One or more of the additional sensor 380 can be thermal sensors which can detect, identify, and/or measure a temperature of a corresponding component 360. In one embodiment, one or more additional sensor 380 of the processor 320, the memory component, the graphics component, the network component, the audio component, and the storage device 340 detect a corresponding temperature of the processor 320, the memory component, the graphics component, the network component, the audio component, and the storage device 340.

The processor 320 and/or the power application 310 can compare the ambient temperature to one or more of the temperatures of the components 360 and determine whether one or more temperatures of the components 360 is less than or within a predefined proximity 375 of the ambient temperature. The predefined proximity 375 can be represented as a numerical value X. In one embodiment, if the temperature of one or more of the components 360 is less than X or is no more than X greater than the ambient temperature, the processor 320 and/or the power application 310 will determine that the computing machine 300 includes the sufficient amount of thermal credits 370.

In another embodiment, the processor 320 and/or the power application 310 will compare the temperature of all of the components 360 to the ambient temperature and insure that all of the temperatures are below X or no more than X greater than the ambient temperature before determining that the computing machine 300 includes the sufficient amount of thermal credits. For each of the components 360 which have a temperature less than or no greater than X from the ambient temperature, the processor 320 and/or the power application 310 increment the amount of thermal credits 370 by 1.

The processor 320 and/or the power application 310 repeat this process for each of the components 360 until the temperature of all of the components 360 have been compared to the ambient temperature. At the end of this process, if the amount of thermal credits is equal to or greater than a predefined credit threshold, then the computing machine 100 will be determined to include the sufficient amount of thermal credits 370. The predefined credit threshold can be based on the number of components 360 on the computing machine 300. In another embodiment, the predefined credit threshold can be defined by a user, the processor 320, and/or the power application 310.

The processor 320 and/or the power application 310 can determine whether the computing machine 310 includes the sufficient amount of thermal credits 370 in response to the computing machine 300 entering a power on state from a power off state and before a boot process of the computing machine 300 begins. In another embodiment, the processor 320 and/or the power application 310 can determine whether the computing machine 300 includes the sufficient amount of thermal credits 370 while the computing machine 300 is in a power off state. When the computing machine 300 is in a power off state, one or more components 360 of the computing machine 300, such as the processor 310 can continue to receive a small amount of power to determine whether the computing machine 300 includes the sufficient amount of thermal credits 370.

If the computing machine 300 includes the sufficient amount of thermal credits 370, the processor 320 and/or the power application 310 can assign the thermal credits 370 a value, such as 1, to represent that the amount of thermal credits 370 is sufficient. In another embodiment, the processor 320 and/or the power application 310 can mark the thermal credits 370 as sufficient.

Figure 3B:
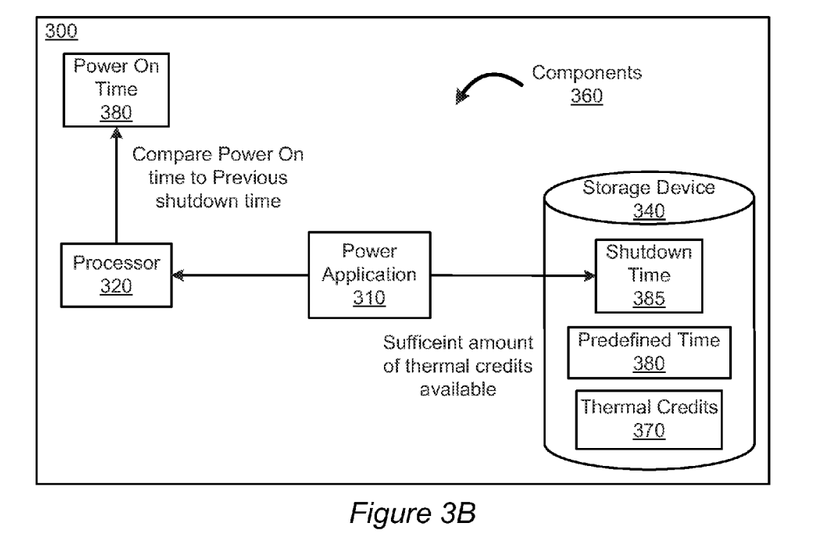
FIG. 3B illustrates a block diagram of a power application managing a computing machine according to another embodiment.

FIG. 3B illustrates a block diagram of a power application 310 managing a computing machine 300 according to another embodiment. As noted above, an amount of thermal credits 370 can be based on amount of time which the computing machine 300 has been powered off. When determining whether the computing machine 300 includes the sufficient amount of thermal credits 370, the processor 320 and/or the power application 310 can additionally identify a last shut down time 385 of the computing machine 300.

The last shut down time 385 corresponds to when the computing machine 300 most recently transitioned from a power on state to a power off state. As illustrated in FIG. 3B, the computing machine 300 can record and store the last shut down time 385 in one more locations, such as the storage device 340, on the computing machine 300. In one embodiment, as illustrated in FIG. 3B, the processor 320 and/or the power application 310 can compare the last shut down time 385 to a present a power on time of the computing machine 300. The present power on time corresponds to when the computing machine 300 is transitioning from a power off state to a power on state.

In one embodiment, the processor 320 and/or the power application 310 can monitor a power component of the computing machine 300 to determine whether the power component is increasing an amount of power supplied to one or more components 360 of the computing machine 300. If the power component is detected to be increasing an amount of power to one or more components of the computing machine 300, the computing machine will be determining to be powering on.

If the processor 320 and/or the power application 310 detect the computing machine 300 transitioning from the power off state the power on state, the processor 320 and/or the power application 310 can note the present power on time Y and compare the present power on time to the last shut down time 385 Z. The processor 320 and/or the power application 310 can additionally calculate a difference between the two times to identify an amount of time which the computing machine 300 has been powered off (Y-Z). If the amount of time which the computing machine 300 has been powered off (Y-Z) is greater than a predefined amount of time 380, the processor 320 and/or the power application 310 can determine that the computing machine 300 includes a sufficient amount of thermal credits 370. The predefined amount of time 380 can be defined by a user, the computing machine 300, and/or by one or more of the components 360.

In another embodiment, the processor 320 and/or the power application 310 can determine whether the computing machine 300 includes the sufficient amount of thermal credits 370 while the computing machine 300 is powered off. The processor 320 and/or the power application 310 can receive a small amount of power from the power component while the computing machine is powered off to periodically and/or continuously calculate a difference between a present polled time and the last shut down time (Y-Z) to determine whether the difference (Y-Z) is greater than the predefined amount of time 380.

If the computing machine 300 includes the sufficient amount of thermal credits 370, the processor 320 and/or the power application 310 can assign the thermal credits 370 a value, such as 1, to represent that the amount of thermal credits 370 is sufficient. In another embodiment, the processor 320 and/or the power application 310 can mark the thermal credits 370 as sufficient.

Figure 4A:
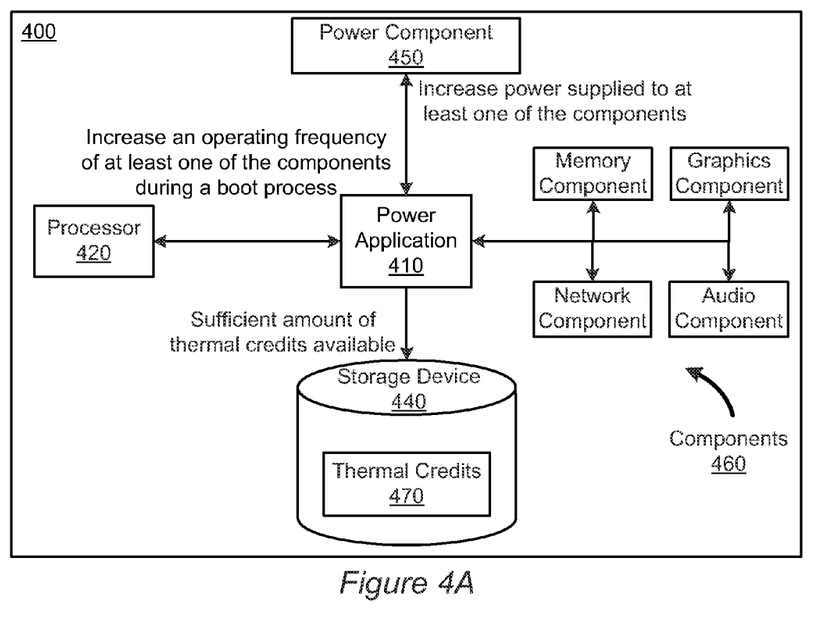
FIG. 4A illustrates a block diagram of a power application increasing an operating speed of at least one component of a computing machine according to an embodiment.

FIG. 4A illustrates a block diagram of a power application 410 increasing an operating speed of at least one component 460 of a computing machine 400 according to an embodiment. As illustrated in FIG. 4A, in response to the computing machine 400 powering on, the processor 420 and/or the power application 410 can determine whether the computing machine 400 includes a sufficient amount of thermal credits 470. In one embodiment, in response to the computing machine 400 powering on, the processor 420 and/or the power application 410 can use one or more of the methods disclosed in FIG. 3A and FIG. 3B to determining whether the computing machine 400 includes the sufficient amount of thermal credits 470.

In one embodiment, if it was previously determined whether the computing machine 400 includes the sufficient amount of thermal credits 470 while the computing machine 400 was in a power off state, the processor 420 and/or the power application 410 can access the thermal credits 470 stored on a storage device 440 and determine whether the thermal credits 470 includes a value of 1 or is marked as "sufficient." If the thermal credits 470 include the value of 1 and/or is marked as sufficient or one or more of the methods disclosed above yield that the computing machine 400 includes the sufficient amount of thermal credits 470, the processor 420 and/or the power application 410 proceed to increase an operating speed of one or more components 460 of the computing machine 400 during a boot process.

As noted above, the boot process includes one or more of the components 460 being loaded, initialized and/or an operating system of the computing machine 400 being loaded. When loading and/or initializing one or more of the components 460, the processor 420 and/or the power application can load one or more drivers or firmware for the corresponding components 460. In one embodiment, when loading the operating system, the processor 420 and/or the power application 410 load an image of the operating system onto the memory component or a ROM of the computing machine 400 for use.

As illustrated in FIG. 4A, one or more of the components 460 can include the processor 420, a memory component, a graphics component, a power component, a network component, an audio component, and/or the storage device 440. In one embodiment, a power component 450 of the computing machine 400 is also instructed by the processor 420 and/or the power application 410 to increase an amount of power supplied to one or more of the components 460. Using the additional power, one or more of the components 460 can be configured to increase an operating speed. In one embodiment, one or more of the components 460 will automatically increase an operating speed in response to receiving additional power.

In another embodiment, the processor 420 and/or the power application 410 can configure the components 460 to use the additional power to increase an operating speed. As illustrated in the present embodiment, when increasing an operating speed, the processor 420 and/or the power application can increase a frequency or operating frequency of one or more of the components 460. In one embodiment, the processor 420 and/or the power application 410 can selectively pick one or more of the components 460, such as the processor 420, the memory component, the storage device 440, and the graphics component to increase an operating speed. In other embodiments, operating speeds of all of the components 460 of the computing machine 400 are increased.

By increasing an operating speed of one or more components 460, the components 460 can complete tasks, such as loading and/or initializing, at a faster speed than if they were operating at a normal or default speed. In one embodiment, by increasing an operating speed of one or more of components 460, the operating system of the computing machine 400 can be loaded for use at a faster speed than if the components 460 are operating at a normal or default speed. As a result, a boot process time of the computing machine 400 can be decreased.

Figure 4B:
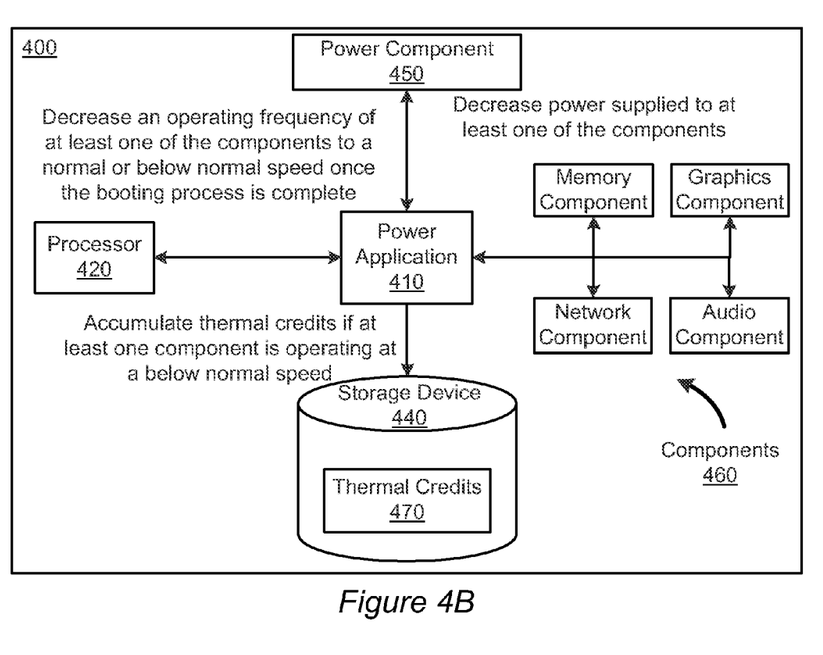
FIG. 4B illustrates a block diagram of a power application decreasing an operating speed of at least one component of a computing machine according to an embodiment.

FIG. 4B illustrates a block diagram of a power application 410 decreasing an operating speed of at least one component 460 of a computing machine 400 according to an embodiment. As noted above, one or more of the components 460 can continue to operate at the increased speed until the boot process is complete. The boot process is determined to be complete in response to one or more of the components 460 being initialized or loaded and/or in response to the operating system of the computing machine 400 being loaded and ready for use on the computing machine 400. The processor 420 and/or the power application 410 can monitor and/or poll the components 460 and the computing machine 400 to determine when the components 460 have been initialized or loaded and/or when the operating system has been loaded.

As illustrated in FIG. 4B, in response to the boot process completing, an operating speed of one or more of the components 460 can be decreased. An operating speed of one or more of the components 460 can be decreased to a normal or below normal speed. In another embodiment, an operating speed of one or more of the components 460 can be decreased before the boot process is complete if the computing machine 400 runs out of thermal credits 470.

As the boot process continues, the amount of thermal credits 470 can continuously be decreased by the processor 420 and/or the power application 410. The amount of thermal credits 470 can be decreased in response to an amount of time spent during the boot process. As the amount of time for the boot process increases, the amounts of thermal credits 470 correspondingly decrease. In another embodiment, the amount of available thermal credits 470 can be decreased in response to an amount of power spent during the boot process. As the amount of power consumed by the components 460 increase, the amount of available thermal credits 470 correspondingly decrease.

As illustrated in FIG. 4B, in response to the boot process completing and/or the thermal credits 470 running out, the processor 420 and/or the power application 410 can instruct the power component 450 to decrease an amount of power supplied to one or more of the components 460. In response to the amount of power supplied to the components 460 decreasing, an operating frequency or a frequency of the corresponding components 460 which were operating at a higher speed can be decreased. In one embodiment, the components 460 can automatically decrease the operating frequency themselves in response to receiving less power. In another embodiment, the processor 420 and/or the power application 410 configure and/or instruct the components 470 to decrease the operating frequency or frequency.

As noted above, the operating speed of one or more of the components 460 can be decreased to a normal operating speed or a below normal operating speed. In one embodiment, if one or more of the components 460 are operating at the below normal operating speed, the corresponding components 460 can consume less power and generate less heat. As a result, the computing machine 400 can continue to accrue thermal credits 470 while the computing machine 400 is powered on. The computing machine 400 can continue to accrue thermal credits 470 while the computing machine 400 is powered on and the processor 420 and/or the power application 410 can use one or more of the methods noted above to determine whether the computing machine 400 includes the sufficient amount of thermal credits 470.

In one embodiment, if the computing machine 400 is beginning a power down or shut down process and the computing machine 400 includes the sufficient amount of thermal credits 470, the processor 420 and/or the power application 410 can proceed to increase an operating speed of one or more of the components 460 of the computing machine 400 during the power down or shut down process.

Figure 5:
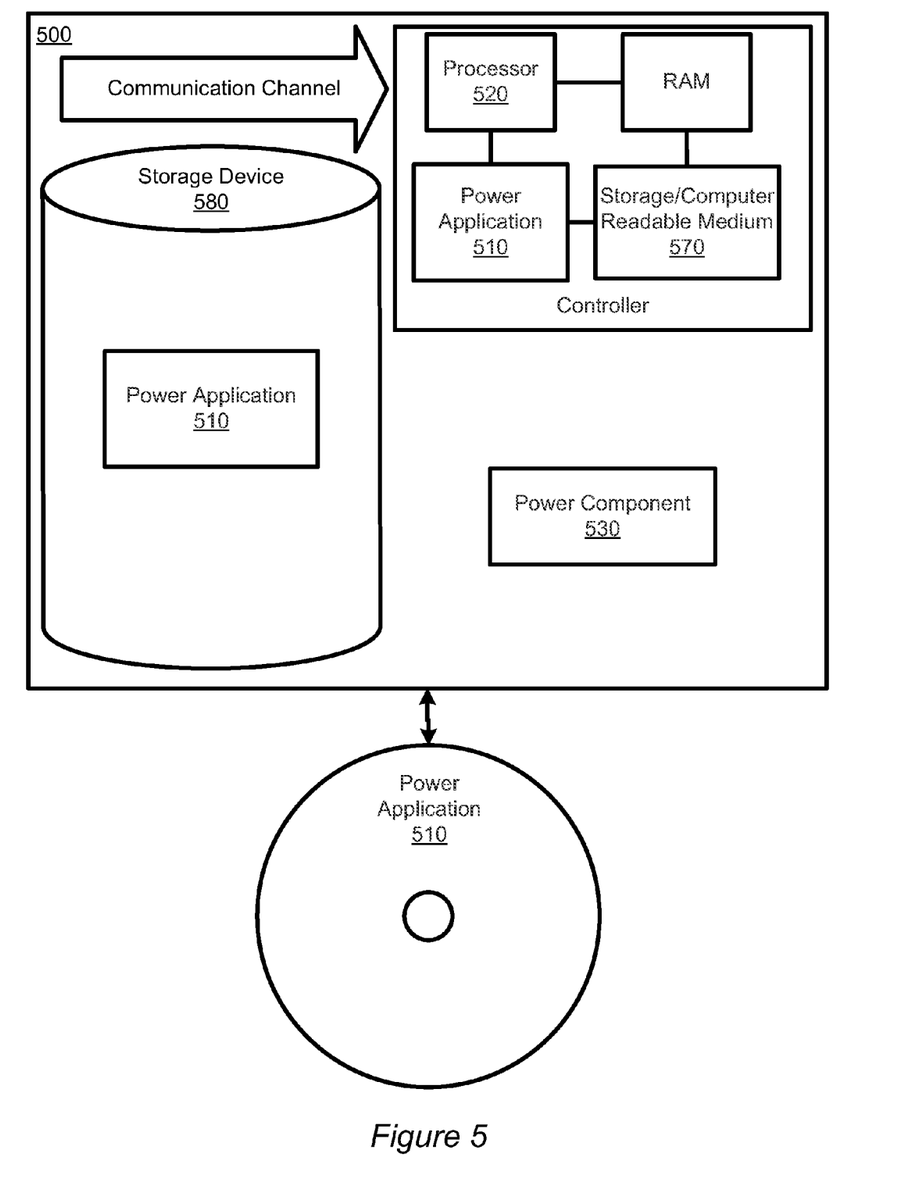
FIG. 5 illustrates a power application on a computing machine and a power application stored on a removable medium being accessed by the computing machine according to an embodiment.

FIG. 5 illustrates a power application 510 on a computing machine 500 and a power application 510 stored on a removable medium being accessed by the computing machine 500 according to an embodiment. For the purposes of this description, a removable medium is any tangible apparatus that contains, stores, communicates, or transports the application for use by or in connection with the computing machine 500. As noted above, in one embodiment, the power application 510 is a BIOS or a firmware that is embedded into one or more components of the computing machine 500 as ROM. In other embodiments, the power application 510 is a software application which is stored and accessed from a hard drive, a compact disc, a flash disk, a network drive or any other form of computer readable medium that is coupled to the computing machine 500.

Figure 6:
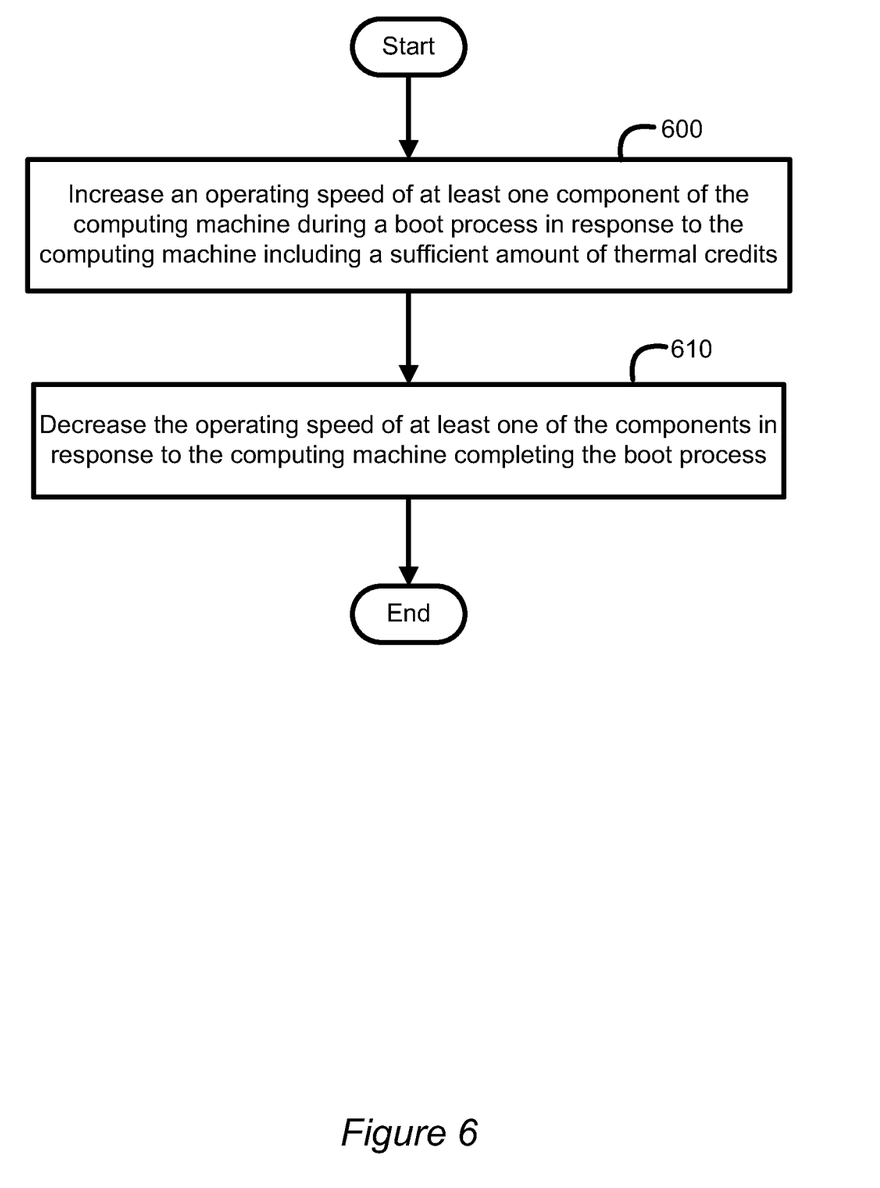
FIG. 6 is a flow chart illustrating a method for booting a computing machine according to an embodiment.

FIG. 6 is a flow chart illustrating a method for booting a computing machine according to an embodiment. The method of FIG. 6 uses a computing machine with a processor, a power component, at least one component of the computing machine, a communication channel, a storage device, and a power application. In other embodiments, the method of FIG. 6 uses additional components and/or devices in addition to and/or in lieu of those noted above and illustrated in FIGS. 1, 2, 3, 4, and 5.

As noted above, the power application is an application which can independently or in conjunction with the processor manage the computing machine. When managing the computing machine, the processor and/or the power application can control a speed of operation of at least one of the components of the computing machine if the computing machine includes a sufficient amount of thermal credits. One or more components of the computing machine include devices which the computing machine can operate at one or more operating speeds during a boot process of the computing machine and when the boot process completes. In one embodiment, a component of the computing machine can include the processor, a memory component, a graphics component, an audio component, a network component, a storage device, and/or any additional device or component of the computing machine which can operate at one or more speeds.

As noted above, thermal credits can be points or credits which can be accrued by the computing machine when the computing machine is powered off. In one embodiment, the computing machine also accrues thermal credits when the computing machine is powered on and when at least one of the components of the computing machine are operating at a decreased speed. In response to the computing machine powering on from a power off state, the processor and/or the power application can initially determine whether the computing machine includes the sufficient amount of thermal credits. In one embodiment, the amount of thermal credits can correspond to an amount of time which the computing machine was powered down. As noted above, the processor and/or the power application can record a previous shut down time of the computing machine and store the time in one or more locations on the computing machine.

In response to the computing machine powering on from the power off state, processor and/or the power application will compare the present time to the previous shut down time and calculate the difference between the two to identify the amount of time which the computing machine has been powered down. If the computing machine has been powered down for greater than the predefined amount of time than the computing machine, the processor and/or the power application will be determine that the computing machine includes the sufficient amount of thermal credits.

In another embodiment, the amount of thermal credits can correspond to a temperature of one or more components of the computing machine. As noted above, the computing machine can include a sensor to detect an ambient temperature around the computing machine. One or more components of the computing machine can additionally include one or more sensors to detect a temperature of the corresponding component. When the computing machine powers on from the power off state, the processor and/or the power application can instruct the sensor of the computing machine to detect the ambient temperature of the computing machine. The processor and/or the power application then instruct one or more sensors on the components to detect a temperature of the corresponding components.

The processor and/or the power application can compare the ambient temperature to one or more temperatures of the components. If the ambient temperature is within a previously defined proximity of at least one of the temperatures of the components, the processor and/or the power application will determine that the computing machine includes the sufficient amount of credits. In another embodiment, the processor and/or the power application will check all of the temperatures of the components to insure that the temperatures are within the predefined proximity before determining that the computing machine includes the sufficient amount of thermal credits.

In response to the computing machine including the sufficient amount of thermal credits, the processor and/or the computing machine increase an operating speed of at least one of the components of the computing machine during the boot process of the computing machine 600. In one embodiment, if the computing machine is determined to include the sufficient amount of thermal credits when powering on, the computing machine will be determined to be cold booting.

When increasing the operating speed of one or more of the components, the processor and/or the power application can increase a frequency, such as a MHZ, or operating frequency of one or more of the corresponding components. In another embodiment, the processor and/or the power application send one or more signals or instructions to the power component to increase an amount of power supplied to one or more of the corresponding components. Using the increased power, one or more of the corresponding components can increase the frequency of the corresponding component when increasing the operating speed.

One or more of the corresponding components will continue to operate at the increased operating speed until the boot process of the computing machine has completed. As noted above, the boot process is determined to be complete when one or more of the components have been initialized and/or loaded for use and/or when the operating system of the computing machine has been loaded. In response to the computing machine completing the boot process, the processor and/or the power application decrease the operating speed of one or more of the corresponding components 610.

When decreasing the operating speed, the processor and/or the power application can instruct the power component to decrease an amount of power supplied to one or more of the corresponding components. In one embodiment, the operating speed of one or more of the corresponding components is decreased to a normal or default operating speed. In another embodiment, the operating speed is decreased to a below normal operating speed. As noted above, when decreased to a below normal operating speed, the computing machine can continue to accrue thermal credits.

If the computing machine has accrued the sufficient amount of thermal credits before the computing machine begins a power down or shut down process, the processor and/or the power application can increase an operating speed of one or more components of the computing machine during a shut down process. The method is then complete or the computing machine can continue to accrue thermal credits while computing machine is powered off. In other embodiments, the method of FIG. 6 includes additional steps in addition to and/or in lieu of those depicted in FIG. 6.

Figure 7:
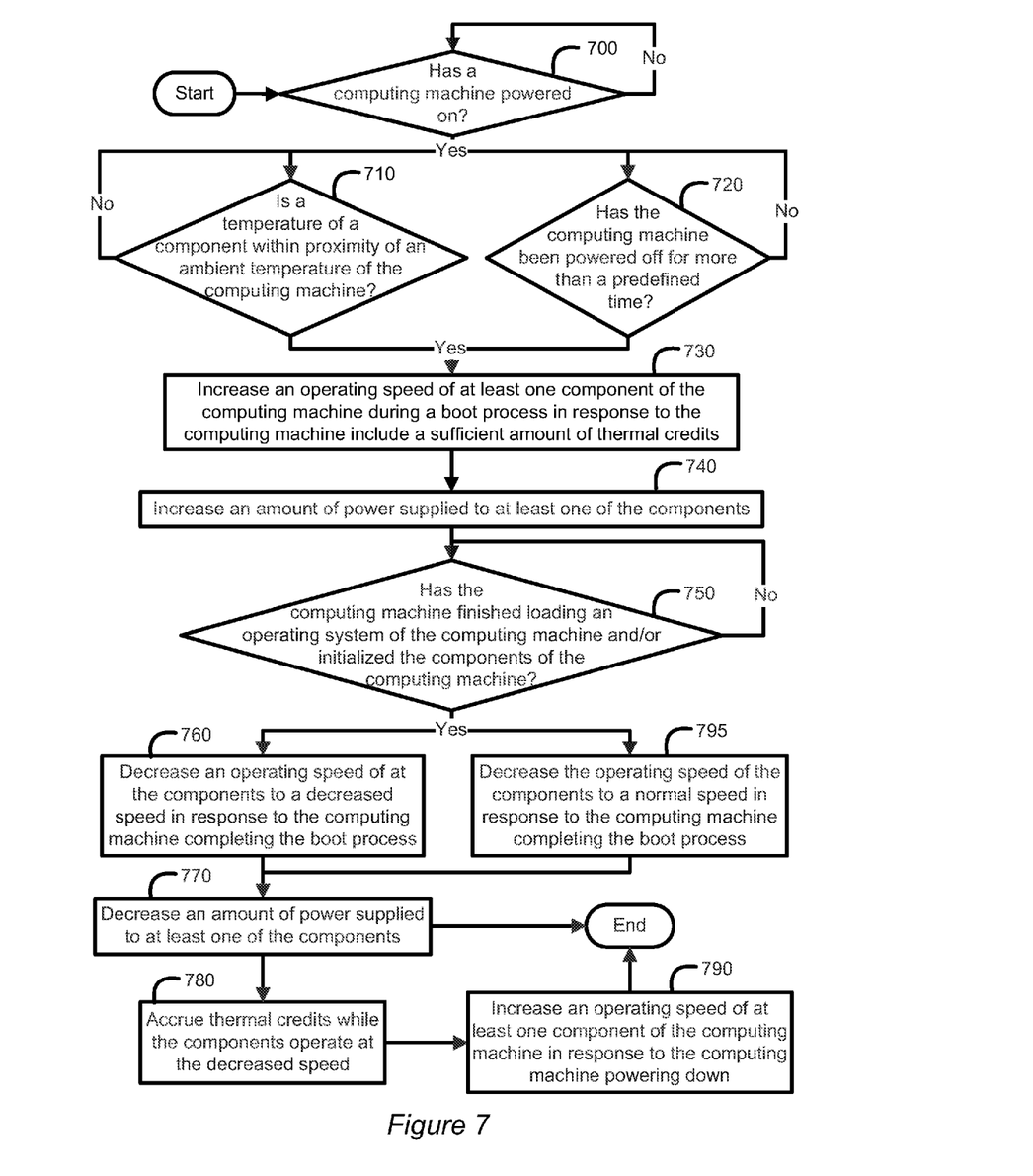
FIG. 7 is a flow chart illustrating a method for booting a computing machine according to another embodiment.

FIG. 7 is a flow chart illustrating a method for booting a computing machine according to another embodiment. Similar to method disclosed above, the method of FIG. 7 uses a computing machine with a processor, a power component, at least one component of the computing machine, a communication channel, a storage device, and a power application. In other embodiments, the method of FIG. 7 uses additional components and/or devices in addition to and/or in lieu of those noted above and illustrated in FIGS. 1, 2, 3, 4, and 5.

As illustrated in FIG. 7, a processor and/or the power application initially determine whether the computing machine is powering on 700. As noted above, the computing machine is powering on if the computing machine is transitioning from a power off state to a power on state. If the computing machine is not detected to be powering on, the processor and/or the power application can continue to detect for the computing machine transitioning into a power on state from a power off state 700.

In response to detecting the computing machine power on, the processor and/or the power application can proceed to determine whether the computing machine includes a sufficient amount of thermal credits. In one embodiment, when determining whether the computing machine includes the sufficient amount of thermal credits, the processor and/or the power application can determine whether the temperature of one or more components of the computing machine is within a predefined proximity of an ambient temperature of the computing machine 710.

The computing machine can include a sensor mounted to an exterior of the computing machine and one or more components of the computing machine be coupled to one or more sensors. When identifying an ambient temperature of the computing machine, the processor and/or the power application can use the sensor of the computing machine to detect, identify, and/or measure the ambient temperature. The processor and/or the power application can also use one or more sensors on the components of the computing machine to detect, identify, and/or measure a temperature of the component.

The processor and/or the power application compare the ambient temperature to at least one temperature of a component of the computing machine. If one or more temperatures of the components is less than or no greater than X of the ambient temperature, the processor and/or the power application will determine that the computing machine includes the sufficient amount of thermal credits. In another embodiment, the processor and/or the power application compare the ambient temperature to the temperatures each of the components to insure the temperature of the components is within the predefined proximity of the ambient component.

In other embodiments, when determining whether the computing machine includes the sufficient amount of thermal credits, the processor and/or the power application will determine whether the computing machine has been powered off for more than a predefined time 720. As noted above, when the computing machine powers down or shuts down, the processor and/or the power application can record and store a last shut down time of the computing machine. When determining whether the computing machine has been powered off for more than the predefined time, the processor and/or the power application can compare a present time to the last shut down time and determine whether the difference is greater than a predefined time.

If the difference is greater than the predefined time, the processor and/or the power application will determine that the computing machine includes the sufficient amount of thermal credits. In another embodiment, before the computing machine has powered on and while the computing machine is powered off, the processor and/or the power application can periodically or continuously determine whether the computing machine includes the sufficient amount of thermal credits. One or more components of the computing machine can continue to receive a small amount of power from the power component for the processor and/or the power application to monitor and determine whether the temperature of one or more components is less than or no greater than X of an ambient temperature of the computing machine and/or to determine whether the computing machine has been powered off for more than a predefined amount of time.

In one embodiment, if the computing machine is determined to not include the sufficient amount of thermal credits, the processor and/or the power application can continue to determine whether the computing machine includes the sufficient amount of thermal credits 710 and 720. In another embodiment, the processor and/or the power application can continue with a boot process of the computing machine without increasing an operating speed of at least one of the components. If the computing machine is determined to include the sufficient amount of thermal credits, the processor and/or the power application will determine that the computing machine is cold booting and proceed to increase an operating speed of at least one component of the computing machine during a boot process 730.

In one embodiment, the processor and/or the power application additionally instruct the power component to increase an amount of power supplied to a corresponding component 740. Using the increased power, the processor and/or the power application can access the corresponding component and instruct or configure the corresponding component to increase an operating frequency of the corresponding component. The processor and/or the power application can repeat this for one or more of the components. The processor and/or the power application can then determine whether the booting process of loading or initializing one or more of the components and/or loading an operating system of the computing machine has finished 750. If the boot process is not complete, one or more of the components will continue to operate at the increased operating speed and the processor and/or the power application can continue to determine whether the boot process is complete 750.

In one embodiment, once the boot process is determined to be complete, the processor and/or the power application can decrease an operating speed of one or more of the corresponding components to a normal operating speed 795. Because one or more of the components are no longer operating at the increased speed, the power component can decrease an amount of power supplied to the corresponding components 770. The process can then be complete.

In another embodiment, in response to the boot process completing, the processor and/or the power application can decrease an operating speed of one or more of the components to a decreased or a below normal operating speed 760. Because one or more of the components are no longer operating at the increased speed, the power component can decrease an amount of power supplied to the corresponding components 770. In one embodiment, in response to operating at a decreased or below normal operating speed, the amount of heat generated by one or more of the components can be decreased. As a result, the computing machine can continue to accrue thermal credits while one or more of the components operate at the decreased or below normal operating speed 780. As the computing machine continues to operate, the computing machine can continue to accrue thermal credits until a power down or shut down process is detected.

In response to the processor and/or the power application detecting the power down or shut down process, the processor and/or the power application can determine whether the computing machine includes a sufficient amount of thermal credits using one or more of the methods disclosed above. If the computing machine includes the sufficient amount of thermal credits, the processor and/or the power application can increase an operating speed of one or more of the components during a power down or shut down process of the computing machine 790. The method is then complete or the computing machine can continue to accrue thermal credits while the computing machine is powered off. In other embodiments, the method of FIG. 7 includes additional steps in addition to and/or in lieu of those depicted in FIG. 7.

What is claimed is:

1. A method for booting a computing machine comprising:
   in response to the computing machine powering on, identifying an amount of thermal credits available on the computing machine based on an amount of time which the computing machine has been powered off;
   increasing an operating speed of at least one component of the computing machine during a boot process in response to the amount of thermal credits being determined to be sufficient; and
   decreasing the operating speed of the at least one component of the computing machine in response to the computing machine completing the boot process.

2. The method of claim 1, wherein the amount of thermal credits is determined to be sufficient when the amount of the thermal credits matches a predefined credit threshold.

3. The method of claim 1, further comprising comparing a temperature of the at least one component of the computing machine to an ambient temperature around the computing machine.

4. The method of claim 3, wherein the amount of thermal credits is determined to be sufficient when the temperature of the at least one component is either at least one of less than the ambient temperature or within a predefined proximity of the ambient temperature.

5. The method of claim 1, wherein identifying the amount of time which the computing machine has been powered off includes comparing a present time to a last shut down time of the computing machine.

6. The method of claim 5, wherein the amount of thermal credits is determined to be sufficient when a difference between the present time and the last shut down time exceed a predefined time.

7. A computing machine comprising:
   a power component configured to power on the computing machine and modify an amount of power supplied to at least one component of the computing machine; and
   a processor to:
      in response to the computing machine powering on, identify an amount of thermal credits available on the computing machine based on an amount of time which the computing machine has been powered off;
      determine if the amount of thermal credits is sufficient; and
      utilize an increase in the amount of power from the power component to increase an operating speed of the at least one component during a boot process in response to the amount of thermal credits being determined to be sufficient.

8. The computing machine of claim 7, wherein the processor identifies the amount of thermal credits available based on a temperature of the at least one component of the computing machine.

9. The computing machine of claim 7, wherein the at least one component operates at the increased operating speed until the computing machine completes the boot process and initialize the at least one component.

10. The computing machine of claim 9 wherein the power component is configured to decrease the amount of power supplied to the at least one component in response to the computing machine completing the boot process.

11. A computer-readable program that is stored in a non-transitory computer-readable medium, the computer-readable program comprising:
   a power application, when executed, causes a computing machine to:
      detect an ambient temperature around the computing machine;
      determine whether the computing machine includes a sufficient amount of thermal credits when the computing machine powers on by comparing a temperature of at least one component of the computing machine to the detected ambient temperature;

wherein the power application increases an operating speed of the at least one component of the computing machine during a boot process in response to the computing machine having the sufficient amount of the thermal credits; and wherein the power application decreases an operating speed of the at least one component in response to the computing machine completing the boot process.

12. The computer-readable program in a non-transitory computer-readable medium of claim 11, wherein the computing machine accrues the thermal credits if the at least one component operates at a below normal speed in response to the computing machine completing the boot process.

13. The computer-readable program in a non-transitory computer-readable medium of claim 11, wherein the power application increases the operating speed of the at least one component if the computing machine is powering down and the power application has accrued the sufficient amount of the thermal credits.

* * * * *

UNITED STATES PATENT AND TRADEMARK OFFICE
CERTIFICATE OF CORRECTION

| | | |
|---|---|---|
| PATENT NO. | : 9,052,915 B2 | Page 1 of 1 |
| APPLICATION NO. | : 13/822630 | |
| DATED | : June 9, 2015 | |
| INVENTOR(S) | : William C Hallowell et al. | |

It is certified that error appears in the above-identified patent and that said Letters Patent is hereby corrected as shown below:

In the drawings:

In sheet 3 of 7, below reference numeral 310, line 1, delete "Sufficeint" and insert -- Sufficient --, therefor.

In sheet 7 of 7, reference numeral 760, lines 1-2, delete "of at the" and insert -- of the --, therefor.

Signed and Sealed this
Eighth Day of December, 2015

Michelle K. Lee
*Director of the United States Patent and Trademark Office*